(12) United States Patent
Jiang et al.

(10) Patent No.: US 11,086,421 B2
(45) Date of Patent: Aug. 10, 2021

(54) TOUCH PANEL

(71) Applicants: Tsinghua University, Beijing (CN); HON HAI PRECISION INDUSTRY CO., LTD., New Taipei (TW)

(72) Inventors: Kai-Li Jiang, Beijing (CN); Jia-Ping Wang, Beijing (CN); Rui Xie, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 498 days.

(21) Appl. No.: 15/297,149

(22) Filed: Oct. 19, 2016

(65) Prior Publication Data
US 2017/0038860 A1 Feb. 9, 2017

Related U.S. Application Data

(63) Continuation of application No. 13/152,268, filed on Jun. 3, 2011.

(30) Foreign Application Priority Data

Apr. 1, 2011 (CN) .......................... 201110082160.1

(51) Int. Cl.
*G06F 3/041* (2006.01)
*B32B 9/04* (2006.01)
(Continued)

(52) U.S. Cl.
CPC ............... *G06F 3/041* (2013.01); *B32B 9/04* (2013.01); *B32B 27/30* (2013.01); *B32B 27/32* (2013.01);
(Continued)

(58) Field of Classification Search
CPC .......... G06F 3/041; B32B 9/04; B32B 27/30; B32B 27/32; B32B 27/36; B32B 27/38
(Continued)

(56) References Cited

U.S. PATENT DOCUMENTS

2006/0274048 A1* 12/2006 Spath ..................... G06F 3/045
345/173
2009/0101488 A1* 4/2009 Jiang ...................... G06F 3/044
200/512

(Continued)

OTHER PUBLICATIONS

C.Y. Wang, T.H. Chen, S.C. Chang, "Flexible field emitter made of carbon nanotubes microwave welded onto polymer subsrates", Appl. Phys. Lett. 2007, 90, 103111-1-103111-3.*
(Continued)

*Primary Examiner* — Michael N Orlando
*Assistant Examiner* — Elizabeth Bradford
(74) *Attorney, Agent, or Firm* — ScienBiziP, P.C.

(57) ABSTRACT

A touch panel is related. The touch panel includes a first electrode board, a second electrode board spaced from the first electrode board, a number of transparent spacers disposed between the first electrode board and the second electrode board, and an insulating frame disposed between the first electrode board and the second electrode board and around the plurality of transparent spacers. The first electrode board includes a first substrate, a first carbon nanotube structure located on and buried under a first surface of the first substrate, and two first electrodes electrically connected to the first carbon nanotube structure. A distance between the first carbon nanotube structure and the first surface of the first substrate is less than 10 micrometers.

20 Claims, 15 Drawing Sheets

(51) Int. Cl.
*B32B 27/30* (2006.01)
*B32B 27/32* (2006.01)
*B32B 27/36* (2006.01)
*B32B 27/38* (2006.01)

(52) U.S. Cl.
CPC .......... *B32B 27/365* (2013.01); *B32B 27/38* (2013.01); *B32B 2457/208* (2013.01); *G06F 2203/04103* (2013.01); *Y10T 428/24132* (2015.01); *Y10T 428/265* (2015.01); *Y10T 428/30* (2015.01)

(58) Field of Classification Search
USPC .............. 156/272.2; 428/114; 345/174
See application file for complete search history.

(56) References Cited

U.S. PATENT DOCUMENTS

2009/0160799 A1* 6/2009 Jiang ................. G06F 3/044
 345/173
2009/0201268 A1* 8/2009 Endo ................. G06F 3/045
 345/174

OTHER PUBLICATIONS

M. Zhang, S. Fang, A.A. Zakhidov, S.B. Lee, A.E.Aliev, C.D. Williams, K.R. Atkinson, R.H. Baughman, "Strong, Transparent, Multifunctional, Carbon Nanotube Sheets", Science 2005, 309, 1215-1219.*

C.Y. Wang, T.H. Chen, S.C. Chang, "Flexible field emitter made of carbon nanotubes microwave welded onto polymer substrates", Appl. Phys. Lett. 2007, 90, 103111.*

* cited by examiner

TOUCH PANEL

CROSS-REFERENCE TO RELATED APPLICATIONS

This application is a continuation application of U.S. patent application Ser. No. 13/152,268, filed on Jun. 3, 2011, entitled "CARBON NANOTUBE COMPOSITE AND METHOD FOR FORMING SAME," which claims all benefits accruing under 35 U.S.C. § 119 from China Patent Application No. 201110082160.1, filed on Apr. 1, 2011 in the China Intellectual Property Office, disclosure of which is incorporated herein by reference.

BACKGROUND

1. Technical Field

The present disclosure relates to a carbon nanotube composite and a method for forming the carbon nanotube composite.

2. Description of Related Art

Carbon nanotubes are a novel carbonaceous material having extremely small size and extremely large specific surface area. Carbon nanotubes have interesting and potentially useful electrical and mechanical properties, and have been widely used in various fields such as emitters, gas storage and separation, chemical sensors, and high strength composites.

However, one main obstacle in applying carbon nanotubes is the difficulty in processing the common powder form of the carbon nanotube products. Therefore, forming separate and tiny carbon nanotubes into manipulative carbon nanotube structures is necessary.

Carbon nanotube composite is one kind of manipulable carbon nanotube structures. A method for producing carbon nanotube composites includes a stirring step or vibration step to disperse carbon nanotube powder in the composite. However, carbon nanotubes have extremely high surface energy and are prone to aggregate. Therefore, it is very difficult to achieve a composite with carbon nanotubes evenly dispersed therein. Furthermore, the carbon nanotubes dispersed in the carbon nanotube composite produced by this method, results in a surface of the carbon nanotube composite with low conductivity, thereby limiting the application of the carbon nanotube composite.

What is needed, therefore, is to provide a carbon nanotube composite and a method for forming the same that can overcome the above-described shortcomings.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
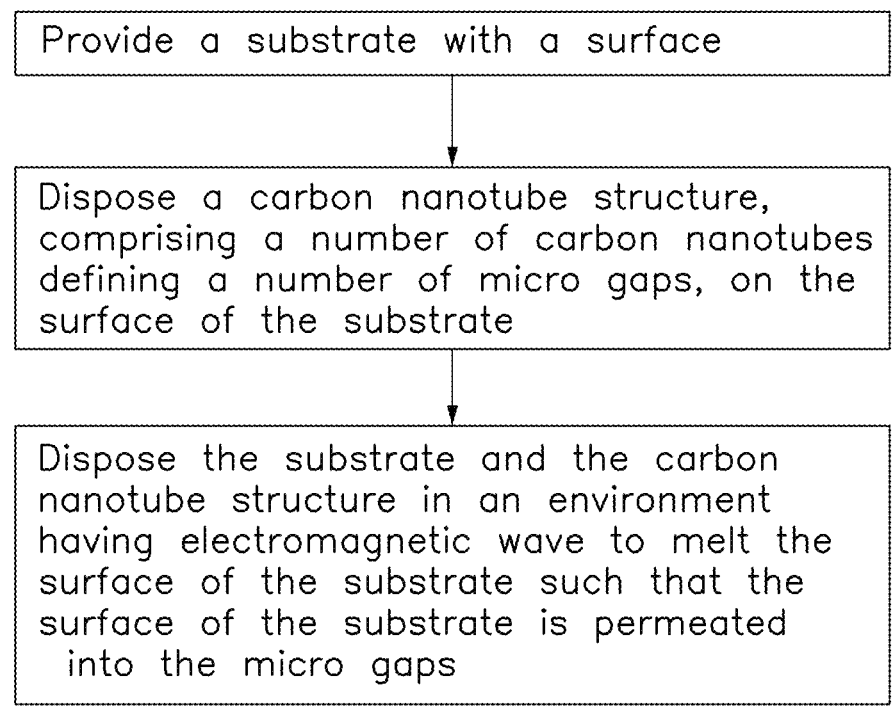
FIG. 1 is a flow chart of one embodiment of a method for forming a carbon nanotube composite.
Figure 2:
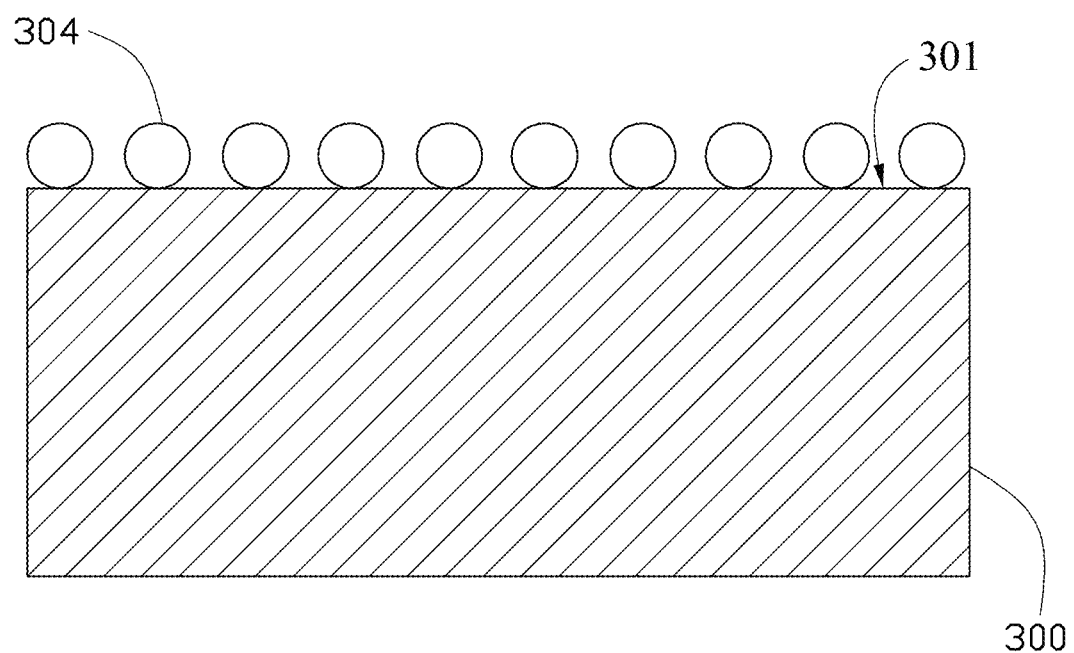
FIG. 2 is a schematic view of one embodiment of a substrate and a carbon nanotube structure.

Referring to FIG. 1 and FIG. 2, a method for forming a carbon nanotube composite includes:

(a) providing a substrate 300 having a surface 301;

(b) disposing a carbon nanotube structure 304 on the surface 301 of the substrate 300; and (c) disposing the substrate 300 and the carbon nanotube structure 304 in an environment filled with electromagnetic waves.

In step (a), the substrate 300 can be made of ceramic, glass, a polymeric material, or a macromolecular material. Examples of the polymeric material include polyethylene, epoxy, bismaleimide resin, cyanate resin, polypropylene, polyethylene, polyvinyl alcohol, polystyrene, polycarbonate, and polymethylmethacrylate. The shape of the substrate 300 is not limited. The surface 301 of the substrate 300 can be planar or a curved surface. In one embodiment, the substrate 300 is a cuboid made of polyethylene, a thickness of the substrate 300 is about 3 millimeters, the surface 301 of the substrate 300 is planar, and a side of the surface 301 is about 50 millimeters.

In the step (b), the carbon nanotube structure 304 includes a number of carbon nanotubes combined by van der Waals force therebetween. The carbon nanotubes define a number of micro gaps. The carbon nanotube structure 304 can be a substantially pure structure of carbon nanotubes, with few impurities. The heat capacity per unit area of the carbon nanotube structure 304 can be less than $2\times10^{-4}$ J/m$^2$*K. In one embodiment, the heat capacity per unit area of the carbon nanotube structure 304 is equal to or less than $1.7\times10-6$ J/m$^2$*K. Because the heat capacity of the carbon nanotube structure 304 is very low, the carbon nanotube structure 304 has a high heating efficiency, a high response heating speed, and high accuracy. Furthermore, the carbon nanotubes of the carbon nanotube structure 304 have a low density of about 1.35 g/cm$^3$, so the carbon nanotube structure 304 is light. The carbon nanotubes of the carbon nanotube structure 304 define a number of micro gaps. Diameters of these micro gaps can be less than 10 micrometers. Because the carbon nanotubes have a large specific surface area and the carbon nanotube structure includes a plurality of micropores, the carbon nanotube structure 304 with a number of carbon nanotubes has large specific surface area. If the specific surface of the carbon nanotube structure 304 is large enough, the carbon nanotube structure 304 is adhesive and can be directly applied to a surface. The carbon nanotube structure 304 can be adhered on the surface directly without extra adhesive material.

The carbon nanotubes of the carbon nanotube structure 304 can be orderly or disorderly arranged. The term 'disordered carbon nanotube structure' refers to a structure where the carbon nanotubes are arranged along different directions, and the alignment directions of the carbon nanotubes are random. The carbon nanotubes arranged along each different direction can be almost the same (e.g. uniformly disordered). The disordered carbon nanotube structure can be isotropic, namely the carbon nanotube film has properties identical in all directions of the carbon nanotube film. The carbon nanotubes in the disordered carbon nanotube structure can be entangled with each other.

The carbon nanotube structure 304 can be an ordered carbon nanotube structure. The term 'ordered carbon nanotube structure' refers to a structure where the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions). The carbon nanotubes in the carbon nanotube structure 304 can be single-walled, double-walled, and/or multi-walled carbon nanotubes. The carbon nanotube structure 304 includes at least one carbon nanotube film. The carbon nanotube film can be a drawn carbon nanotube film, a pressed carbon nanotube film, or a flocculated carbon nanotube film.

The drawn carbon nanotube film includes a number of successive and oriented carbon nanotubes joined end-to-end by van der Waals force therebetween. The drawn carbon nanotube film is a free-standing film, meaning that that the drawn carbon nanotube film does not have to be supported by a substrate and can sustain the weight of itself when it is hoisted by a portion thereof without tearing. A method of making a drawn carbon nanotube film includes:

(b1) providing a carbon nanotube array including a number of carbon nanotubes; and (b2) pulling out at least a drawn carbon nanotube film from the carbon nanotube array.

In the step (b1), a method of making the carbon nanotube array includes:

(b11) providing a substantially flat and smooth substrate;

(b12) applying a catalyst layer on the substrate;

(b13) annealing the substrate with the catalyst at a temperature in a range from about 700° C. to about 900° C. in air for about 30 minutes to about 90 minutes;

(b14) heating the substrate with the catalyst at a temperature in a range from about 500° C. to about 740° C. in a furnace with a protective gas therein; and (b15) supplying a carbon source gas to the furnace for about 5 minutes to about 30 minutes and growing a super-aligned carbon nanotube array that includes the carbon nanotubes from the substrate.

In the step (b11), the substrate can be a P or N-type silicon wafer. In one embodiment, a 4-inch P-type silicon wafer is used as the substrate.

In the step (b12), the catalyst can be made of iron (Fe), cobalt (Co), nickel (Ni), or any combination thereof.

In the step (b14), the protective gas can be made up of at least one of nitrogen ($N_2$), ammonia ($NH_3$), and a noble gas.

In the step (b15), the carbon source gas can be a hydrocarbon gas, such as ethylene ($C_2H_4$), methane ($CH_4$), acetylene ($C_2H_2$), ethane ($C_2H_6$), or any combination thereof.

In the step (b2), the drawn carbon nanotube film can be fabricated by:

(b21) selecting one or more carbon nanotubes having a predetermined width from the carbon nanotube array; and (b22) pulling the carbon nanotubes to obtain nanotube segments at a substantially even/uniform speed to achieve a uniform carbon nanotube film.

In the step (b21), the carbon nanotube segment includes a number of substantially parallel carbon nanotubes. The carbon nanotube segments can be selected by using a tool, such as an adhesive tape, to contact the super-aligned carbon nanotube array including the carbon nanotubes. In the step (b22), the pulling direction can be substantially perpendicular to the growing direction of the super-aligned carbon nanotube array including the carbon nanotubes.

More specifically, during the pulling process, as the initial carbon nanotube segments are drawn out, other carbon nanotube segments are also drawn out end to end due to van der Waals force between ends of adjacent segments. This process of pulling produces a substantially continuous and uniform carbon nanotube film having a predetermined width.

After the step (b2), the drawn carbon nanotube film can be treated by applying an organic solvent to the drawn carbon nanotube film to soak the entire surface of the carbon nanotube film. The organic solvent is volatile and can be ethanol, methanol, acetone, dichloromethane, chloroform, or any appropriate mixture thereof. In one embodiment, the organic solvent is ethanol. After being soaked by the organic solvent, adjacent carbon nanotubes in the carbon nanotube films that are able to, bundle together due to the surface tension of the organic solvent as the organic solvent volatilizes. In another aspect, due to the decrease of the specific surface area from the bundling, the mechanical strength and toughness of the drawn carbon nanotube film are increased and the coefficient of friction of the carbon nanotube films is reduced. Macroscopically, the drawn carbon nanotube film will be an approximately uniform film.

A width of the drawn carbon nanotube film depends on the size of the carbon nanotube array. A length of the drawn carbon nanotube film can be set as desired. In one embodiment, when the substrate is a 4 inch type wafer, the width of the carbon nanotube film can be in a range from about 1 centimeter to about 10 centimeters, and the length of the carbon nanotube film can reach to about 120 meters. The thickness of the drawn carbon nanotube film can be in a range from about 0.5 nanometers to about 100 micrometers. Multiple films can be adhered together to obtain a film of any desired size.

If the carbon nanotube structure includes a number of stacked drawn carbon nanotube films, and the stacked drawn carbon nanotube films can be fabricated by:

(1) providing a number of drawn carbon nanotube films, adhering one drawn carbon nanotube film to a frame;

(2) depositing other drawn carbon nanotube films on the preceding drawn carbon nanotube film successively, thereby achieving at least a two-layer drawn carbon nanotube film; and (3) peeling the stacked drawn carbon nanotube films off the frame to achieve the stacked drawn carbon nanotube films.

The carbon nanotubes in the pressed carbon nanotube film are arranged along a same direction or along different directions. The carbon nanotubes in the pressed carbon nanotube film can rest upon each other. A method of making the pressed carbon nanotube film includes:

(b1') providing a carbon nanotube array and a pressing device; and (b2') pressing the carbon nanotube array to obtain a pressed carbon nanotube film.

In the step (b1'), the carbon nanotube array can be made by the same method as the step (b1).

In the step (b2'), a certain pressure can be applied to the carbon nanotube array by the pressing device. In the process of pressing, the carbon nanotubes of the carbon nanotube array separate from the substrate and obtain the carbon nanotube film under pressure. The carbon nanotubes are substantially parallel to a surface of the carbon nanotube film.

In one embodiment, the pressing device can be a pressure head. The pressure head has a smooth surface. The shape of the pressure head and the pressing direction can determine the direction of the carbon nanotubes arranged therein. When a pressure head (e.g. a roller) is used to travel across and press the array of carbon nanotubes along a predetermined single direction, a carbon nanotube film having a number of carbon nanotubes substantially aligned along a same direction is obtained. It can be understood that there may be some variation in the film. Different alignments can be achieved by applying the roller in different directions over an array. Variations on the film can also occur when the pressure head is used to travel across and press the array of carbon nanotubes several times, as variations will occur in the orientation of the nanotubes. Variations in pressure can also achieve different angles between the carbon nanotubes and the surface of the substrate on the same film. If a planar pressure head is used to press the array of carbon nanotubes along the direction perpendicular to the substrate, a carbon nanotube film having a number of carbon nanotubes isotropically arranged can be obtained. If a roller-shaped pressure head is used to press the array of carbon nanotubes along a certain direction, a carbon nanotube film having a number of carbon nanotubes aligned along the certain direction is obtained. If a roller-shaped pressure head is used to press the array of carbon nanotubes along different directions, a carbon nanotube film having a number of sections having carbon nanotubes aligned along different directions is obtained.

The flocculated carbon nanotube film can include a number of long, curved, disordered carbon nanotubes entangled with each other. Furthermore, the flocculated carbon nanotube film can be isotropic. The flocculated carbon nanotube film can be made by:

(b1") providing a carbon nanotube array;

(b2") separating the carbon nanotube array from the substrate to obtain a number of carbon nanotubes;

(b3") adding the carbon nanotubes to a solvent to obtain a carbon nanotube floccule structure in the solvent; and (b4") separating the carbon nanotube floccule structure from the solvent, and shaping the separated carbon nanotube floccule structure into a carbon nanotube film to achieve a flocculated carbon nanotube film.

In the step (b1"), the carbon nanotube array can be fabricated by the same method as the step (b1).

In the step (b2"), the carbon nanotube array is scraped off the substrate to obtain the carbon nanotubes. The length of the carbon nanotubes can be less than 10 micrometers.

In the step (b3"), the solvent can be selected from water or volatile organic solvent. After adding the carbon nanotubes to the solvent, a process of flocculating the carbon nanotubes can be executed to create the carbon nanotube floccule structure. The process of flocculating the carbon nanotubes can be ultrasonic dispersion of the carbon nanotubes or agitating the carbon nanotubes. In one embodiment, ultrasonic dispersion is used to flocculate the solvent containing the carbon nanotubes from about 10 minutes to about 30 minutes. Due to the carbon nanotubes in the solvent having a large specific surface area and the tangled carbon nanotubes having a large van der Waals force, the flocculated and tangled carbon nanotubes obtain a network structure (e.g., floccule structure).

In the step (b4"), the process of separating the floccule structure from the solvent includes:

(b4"1) filtering out the solvent to obtain the carbon nanotube floccule structure; and (b4"2) drying the carbon nanotube floccule structure to obtain the separated carbon nanotube floccule structure.

In the step (b4"1), the carbon nanotube floccule structure can be disposed in room temperature for a period of time to dry the organic solvent therein.

In the step (b4"2), the process of shaping includes:

(b4"21) putting the separated carbon nanotube floccule structure on a supporter, and spreading the carbon nanotube floccule structure to obtain a predetermined structure;

(b4"22) pressing the spread carbon nanotube floccule structure with a determined pressure to yield a desirable shape; and (b4"23) removing the residual solvent contained in the spread floccule structure to obtain the flocculated carbon nanotube film.

Through flocculating, the carbon nanotubes are tangled together by van der Waals force to obtain a network structure/floccule structure. Thus, the flocculated carbon nanotube film has good tensile strength.

In one embodiment, the carbon nanotube structure 304 is a drawn carbon nanotube film. The carbon nanotube structure 304 is disposed on the surface 301 of the substrate 300.

In the step (c), a power of the electromagnetic waves can be in a range from about 300 watts to about 2000 watts. A melting point of the substrate 300 determines the power and an exposure period of the electromagnetic waves. The higher the melting point of the substrate 300, the higher the power or the longer exposure period of the electromagnetic waves. The electromagnetic waves can be radio frequency, microwaves, near infrared, or far infrared. In one embodiment, the electromagnetic waves are microwaves. A power of the microwaves can be in a range from about 300 watts to about 1500 watts. A frequency of the microwaves can be in a range from about 1 gigahertz to about 5 gigahertz. The carbon nanotube structure 304 and the substrate 300 are kept and are heated in the chamber filled with the microwaves from about 1 second to about 300 seconds. In other embodiments, the carbon nanotube structure 304 and the substrate 300 are kept and are heated in the chamber filled with the microwaves from about 3 seconds to about 90 seconds. The time period the carbon nanotube structure 304 and the substrate 300 are heated in the chamber filled with the microwaves depends on the substrate 300 and the power of the microwaves. The higher the power of the microwaves, the shorter the time the chamber needs to be filled with the microwaves. In one embodiment, the time is about 30 seconds.

In addition, in the step (c), the carbon nanotube structure 304 is exposed to the electromagnetic waves until a portion of the substrate 300 is melted and permeates into the micro gaps defined by the carbon nanotube structure 304. In one embodiment, the carbon nanotube structure 304 disposed on the surface 301 of the substrate 300 can be placed into a chamber filled with the electromagnetic waves. In one embodiment, the material of the substrate 300 is a polymer and barely absorbs the electromagnetic wave energy. Thus, the substrate 300 will not be heated by the electromagnetic waves. The carbon nanotube structure 304 disposed on the surface 301 of the substrate 300 can absorb the energy of the microwaves and generate heat. Because the carbon nanotube structure 304 has a small heat capacity per unit area, a temperature of the carbon nanotube structure 304 rises quickly. This temperature increase will heat the surface 301 of the substrate 300 until the carbon nanotube structure 304 is able to infiltrate the substrate 300. In one embodiment, the heat melts the surface 301 of the substrate 300, and a liquid substrate is present on the surface 301. Because the wettability of the melted liquid substrate and the carbon nanotube structure 304 is good, the melted liquid substrate will infiltrate into micro gaps defined by the carbon nanotube structure 304, as such, the carbon nanotube structure 304 will be coated by the melted liquid substrate. After the melted liquid substrate wets the whole carbon nanotube structure 304, the material of the substrate 300 will stop moving into the micro gaps and the micro gaps will be full of the material of the substrate 300.

Figure 3:
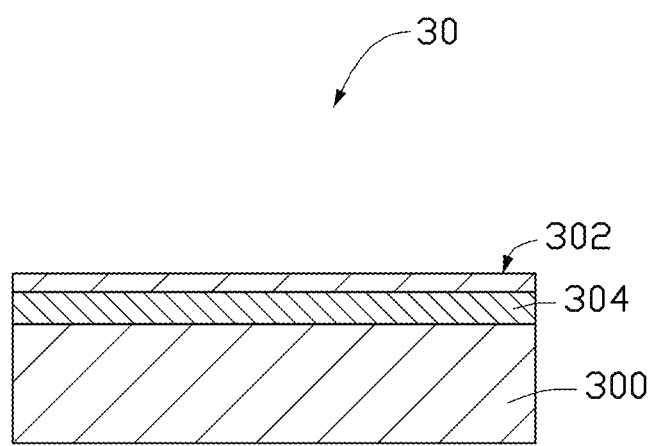
FIG. 3 is a cross-sectional view of one embodiment of a carbon nanotube composite.
Figure 4:
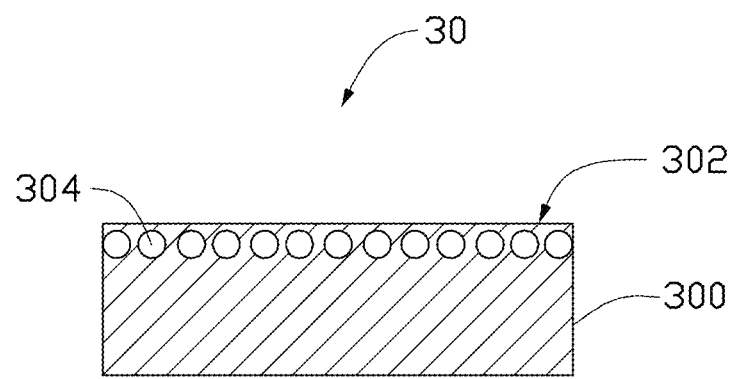
FIG. 4 is similar to FIG. 3, but viewed from another perspective.

The carbon nanotube structure 304 settles into the substrate 300 below a surface 302 of the substrate 300, as shown in FIG. 3 and FIG. 4. Thus, the carbon nanotube structure 304 is disposed in the substrate 300. A thickness of part of the substrate 300 above the carbon nanotube structure 304 between the surface 302 of the substrate 300 and the carbon nanotubes of the carbon nanotube structure 304 is less than 10 micrometers. The heat generated by the carbon nanotube structure 304 can be absorbed by the substrate 300, and the temperature of the carbon nanotube structure 304 can be controlled at under about 700° C., and the carbon nanotube structure 304 will not burn.

In one embodiment, the substrate 300 is made of polyethylene, which has a melting point of about 137° C. The carbon nanotube structure 304 and the substrate 300 can be kept in the chamber filled with microwaves until the temperature of the surface 301 of the substrate 300 reaches or is a little higher than the melting point of the polyethylene. The carbon nanotube structure 304 and the substrate 300 can be kept in the chamber for about 10 seconds, and the carbon nanotube structure 304 will be embedded in the substrate 300.

The step (c) can be carried out in a vacuum environment or in a specific atmosphere of protective gases including nitrogen gas and inert gases. A gas pressure of the environment is in a range from about $1*10^{-2}$ Pascals to about $1*10^{-6}$ Pascals. The carbon nanotube structure 304 can generate a lot of heat and reach the temperature of about 2000° C. to embed into the substrate 300, which has high melting points when the carbon nanotube structure 304 works in the vacuum environment or in the specific atmosphere of protective gases including nitrogen gas and inert gases.

The method for forming the carbon nanotube composite has the following advantages. First, only the surface of the substrate is heated to form the carbon nanotube composite. There is no need to heat the whole substrate, thus the substrate will not be destroyed and energy is saved. Second, the method for forming the carbon nanotube composite can maintain the thickness of the substrate above the carbon nanotube structure at less than 10 micrometers. Thus, the surface of the carbon nanotube composite is conductive. Furthermore, methods described herein for making the carbon nanotube composite are relatively simple and easy to perform.

Referring to FIG. 3 and FIG. 4, a carbon nanotube composite 30 made by the above method is provided. The carbon nanotube composite 30 includes a substrate 300 and a carbon nanotube structure 304. The substrate 300 includes a top surface 302. The carbon nanotube structure 304 is disposed in the substrate 300 and below the surface 302. The carbon nanotube structure 304 is near the top surface 302 of the substrate 300. A distance between the top surface 302 of the substrate 300 and the carbon nanotube structure 304 is less than 10 micrometers. In some embodiments, the distance between the surface 302 of the substrate 300 and the carbon nanotube structure 304 is in a range from about 10 nanometers to about 200 nanometers.

The substrate 300 can be ceramic, glass, a polymeric material, or a macromolecular material. Examples of the polymeric material include polyethylene, epoxy, bismaleimide resin, cyanate resin, polypropylene, polyethylene, polyvinyl alcohol, polystyrene, polycarbonate, and polymethylmethacrylate. In one embodiment, the substrate 300 is a macromolecular material, a melting point of the substrate 300 can be less than 600° C., and a sheet resistance of the surface 302 of the substrate 300 is equal to or less than 8000 ohms. In another embodiment, the substrate 300 is a pure polymeric material, and the sheet resistance of the surface 302 of the substrate 300 exceeds 8000 ohms.

The carbon nanotube structure 304 includes a number of carbon nanotubes combined by van der Waals force therebetween. The carbon nanotube structure 304 can be a substantially pure structure of the carbon nanotubes, with few impurities. A thickness of the carbon nanotube structure 304 can be in a range from about 50 nanometers to about 10 micrometers. The carbon nanotubes define a number of micro gaps having diameters that can be less than 10 micrometers. The micro gaps can be defined by distances between adjacent carbon nanotubes. The carbon nanotubes of the carbon nanotube structure 304 can be orderly or disorderly arranged.

Figure 5:
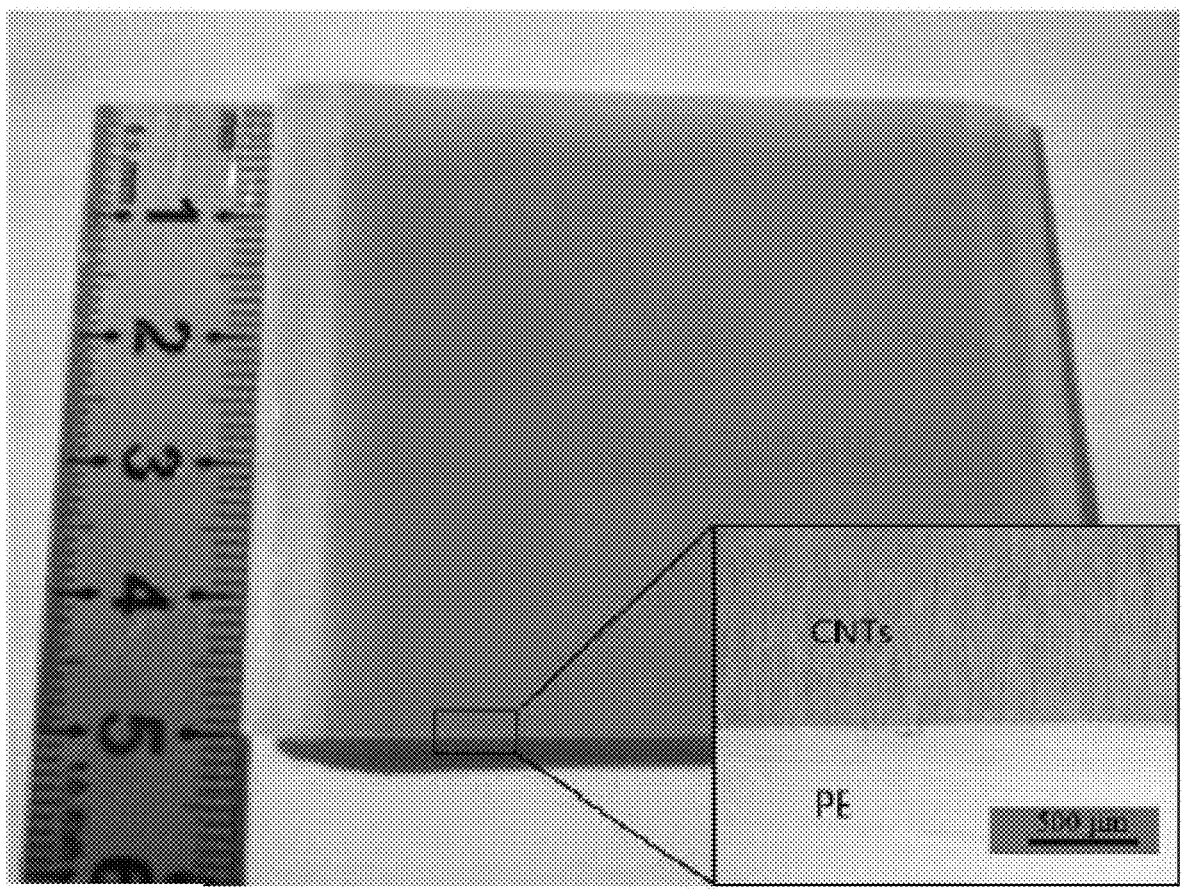
FIG. 5 shows an image of a surface of the carbon nanotube composite and a magnified image of part of the surface of the carbon nanotube composite.
Figure 6:
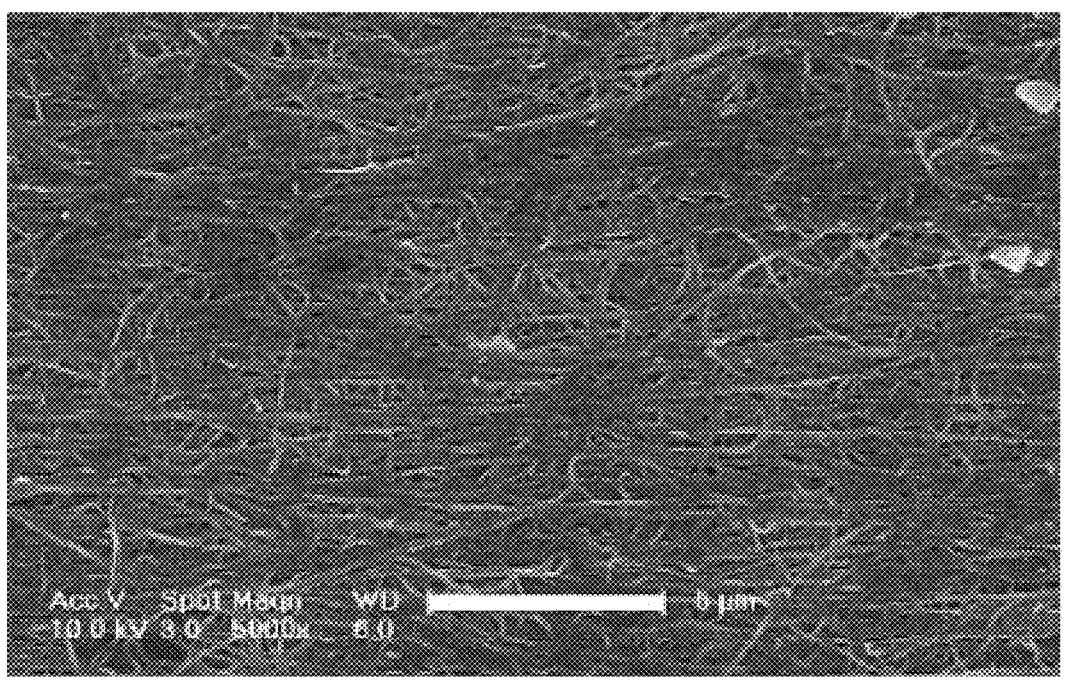
FIG. 6 shows a scanning electron microscope (SEM) image of a top surface of the carbon nanotube composite.
Figure 7:
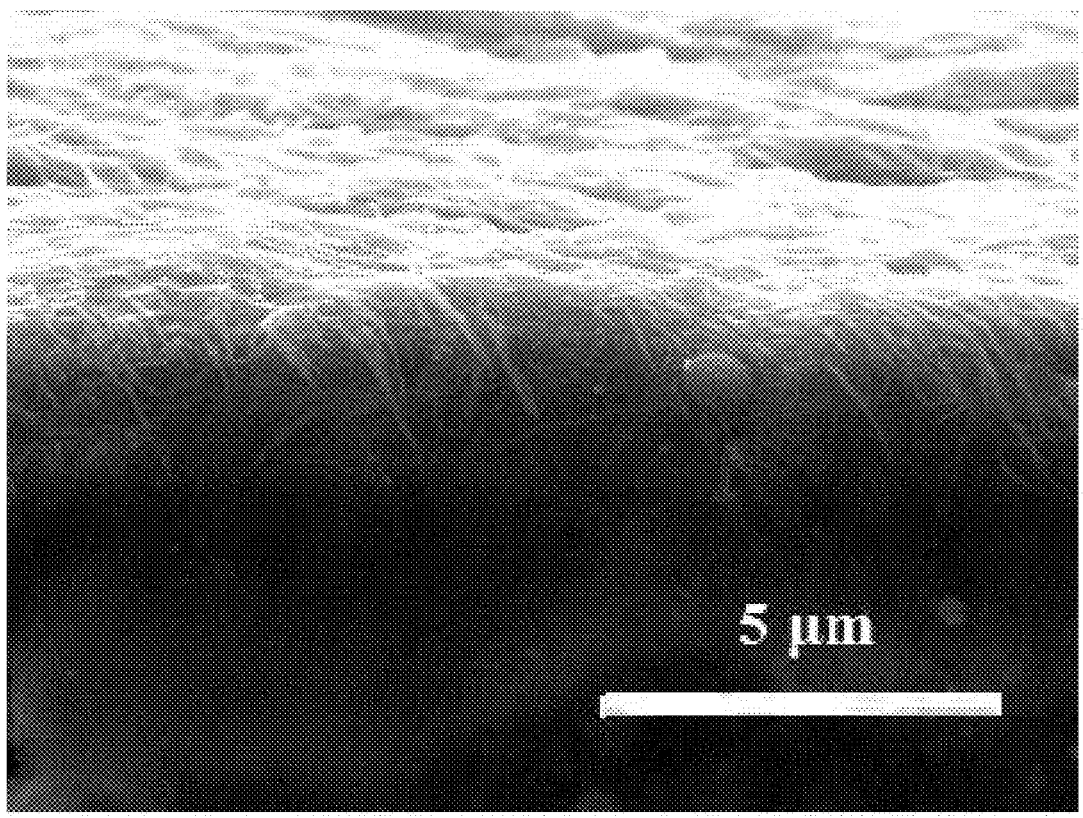
FIG. 7 shows an SEM image of a side surface of the carbon nanotube composite.

In the carbon nanotube composite 30, the micro gaps defined of the carbon nanotube structure 304 are filled with substrate 300. In one embodiment, according to FIG. 5, the surface 302 of the substrate 300 is almost a slick surface, and the carbon nanotube structure 304 is buried below the surface 302. Because the substrate 300 is made of a transparent material, the carbon nanotube structure 304 can be seen from the surface 302. Referring to FIG. 6 and FIG. 7, in the SEM image, the carbon nanotube structure 304 can be clearly seen. Some carbon nanotubes of the carbon nanotube structure 304 protrude from the carbon nanotube structure 304. The carbon nanotubes protruding from the carbon nanotube structure 304 are also coated by the material of the substrate 300. During the process, because wettability of the melted liquid substrate and the carbon nanotube structure 304 is good, the melted liquid substrate will infiltrate into micro gaps of the carbon nanotube structure 304, and the carbon nanotube structure 304 will be coated by the melted liquid substrate. A thickness of the substrate 300 coated on each of the protruding carbon nanotubes is less than 100 nanometers. In some embodiments, the thickness is in a range from about 20 nanometers to about 30 nanometers. In FIG. 7, the protruding carbon nanotubes of the carbon nanotube structure 304 are coated by the material of the substrate 300, and the diameters of the protruding carbon nanotubes are in a range from about 70 nanometers to about 90 nanometers. The diameters of the carbon nanotubes without being coated by the material of the substrate 300 are in a range from about 10 nanometers to about 30 nanometers. As such, the thickness of the substrate 300 coated on surfaces of the protruding carbon nanotubes is about 30 nanometers.

Figure 8:
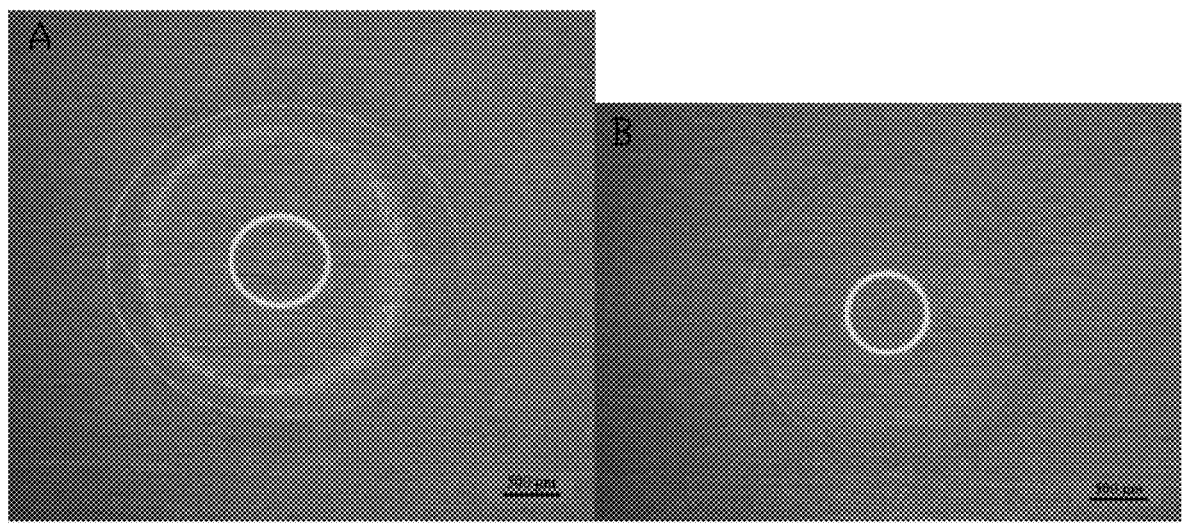
FIG. 8 shows an image of the wetting quality of the carbon nanotube structure disposed on a surface of the substrate exposed to microwaves and an image of the wetting quality of the carbon nanotube structure disposed on the surface of the substrate without exposure to microwaves.

Referring to FIG. 8, image A, a water drop is applied on a surface of the carbon nanotube structure 304, including a drawn carbon nanotube film disposed on the surface of the substrate 300. The water drop will spread on the carbon nanotube structure 304 along a direction of the carbon nanotubes to form an elliptical structure having an area of about 5.69 mm$^2$ because the carbon nanotubes in the drawn carbon nanotube film are oriented in a same direction. Referring to FIG. 8, image B, after the carbon nanotube structure 304 and the substrate 300 are heated by the microwaves, the carbon nanotube structure 304 is buried under the surface 302. After the water drop has dropped on the surface 302, the water drop will spread to form a round structure having an area of about 5.14 mm$^2$.

Figure 9:
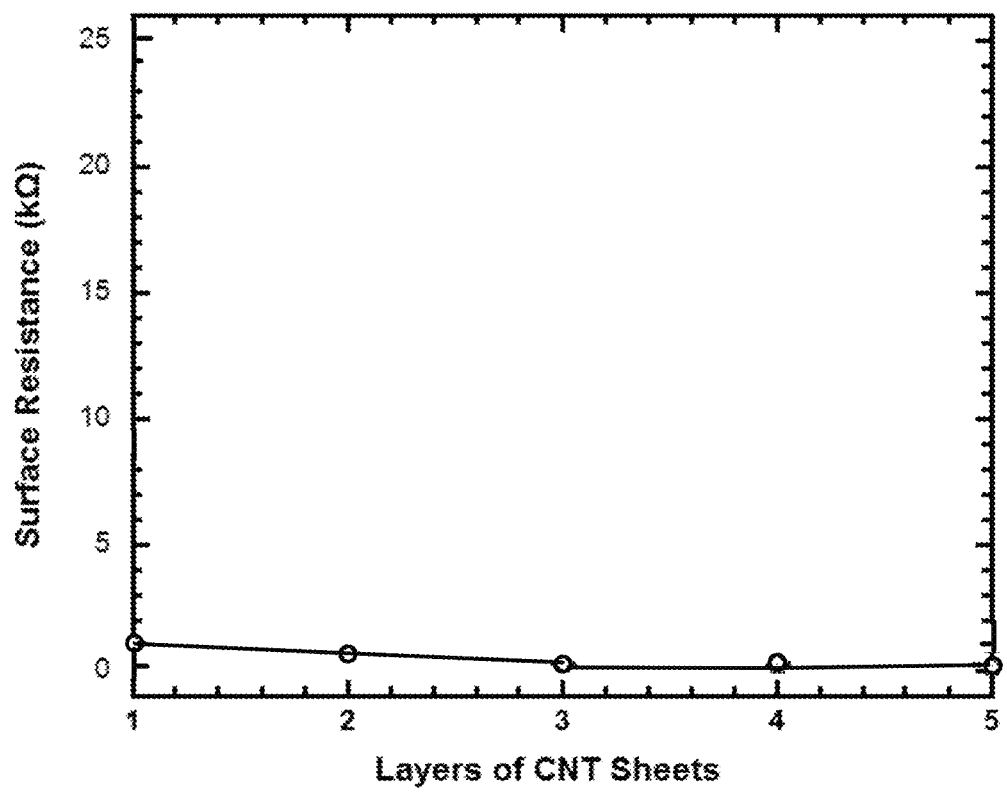
FIG. 9 is a waveform chart of a sheet resistance characteristic curve of the carbon nanotube composite.

In one embodiment, because the substrate 300 is the macromolecular material and the thickness of the substrate 300 above the carbon nanotube structure 304 is less than 10 micrometers, the surface 302 of the carbon nanotube composite 30 is conductive. A sheet resistance of the surface 302 of the substrate 300 is equal to or less than 8000 ohms. The sheet resistance of the surface 302 of the substrate 300 is about 5000 ohms. In another embodiment, because the substrate 300 is a pure polymeric material, the sheet resistance of the surface 302 of the substrate 300 exceeds 8000 ohms. Furthermore, referring to FIG. 9, the sheet resistance of the surface 302 of the substrate 300 can be about 400 ohms by adjusting layers of the carbon nanotube structure 304.

An experiment proved that the conductivity of the surface 302 is not affected by friction from the outside. The experiment is performed on one embodiment of the carbon nanotube composite 30, according to the following steps:

providing the carbon nanotube composite 30, wherein the carbon nanotube composite 30 is a cuboid, and an area of the surface 302 is about 64 mm$^2$;

applying two electrodes on the opposite sides of the surface 302 to measure the sheet resistance; and scraping the surface 302 with a tip of a needle with a pressure force of about 0.7 Newton between the two electrodes, wherein the needle has a tip covered by cotton.

During the scraping step, the two electrodes are used to measure the sheet resistance, and the sheet resistance changes less than 10% after scraping the surface 302 about 50 times. On the contrary, if the carbon nanotube structure 304 is disposed on the surface 302 of the substrate 300 without exposure to the microwaves, the needle would easily destroy the carbon nanotube structure 304. Thus, the sheet resistance would rapidly change.

Figure 10:
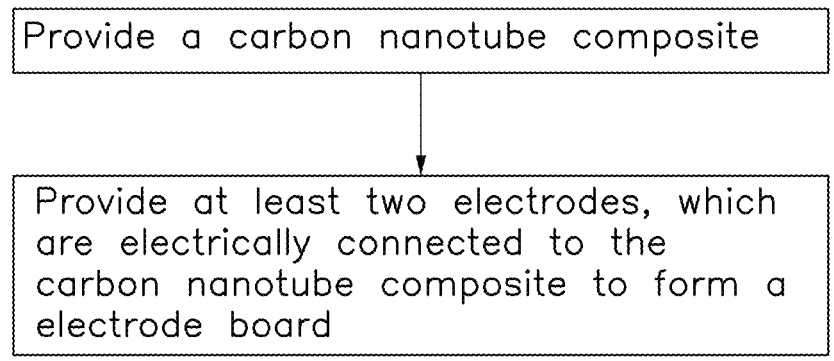
FIG. 10 is a flow chart of one embodiment of a method for forming an electrode board.

Referring to FIG. 10, a method for forming an electrode board includes:
(a) providing a carbon nanotube composite; and
(b) disposing two electrodes between opposite sides of the carbon nanotube composite.

In the step (a), the carbon nanotube composite is the carbon nanotube composite 30 as shown in FIG. 3 and FIG. 4. A material of the electrodes can be metal, carbon nanotube films, silver paste, or any conductive material. In one embodiment, silver paste is applied on the opposite sides of the carbon nanotube composite and then dried at a temperature in a range from about 100° C. to about 120° C. for about 10 minutes to about 60 minutes. Thus, the electrodes are formed.

In the step (b), the electrodes are electrically connected to the carbon nanotube composite 30 to form the electrode board. A method of electrically connecting the electrodes to the carbon nanotube composite 30 includes the steps of:
(b1) removing a part of the surface of the substrate to expose a part of the carbon nanotube structure; and
(b2) disposing the electrodes on the exposed carbon nanotube structure.

Figure 11:
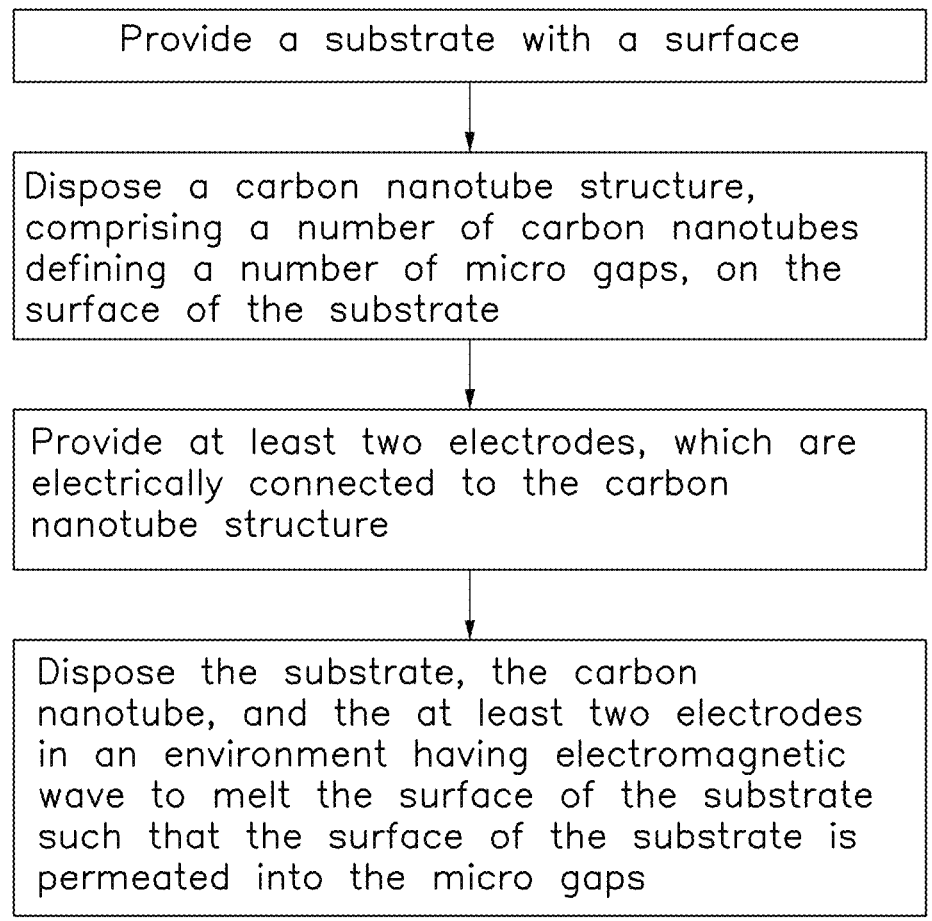
FIG. 11 is a flow chart of another embodiment of a method for forming an electrode board.

Referring to FIG. 11, a method for forming an electrode board includes:
(a) providing a substrate having a surface;
(b) disposing a carbon nanotube structure on the surface of the substrate;
(c) disposing two electrodes between opposite sides of the carbon nanotube structure; and
(d) disposing the substrate, the carbon nanotube structure, and the electrodes in an environment filled with electromagnetic waves.

In the step (b), the carbon nanotube structure includes a number of carbon nanotubes combined by van der Waals force therebetween. The carbon nanotubes define a number of micro gaps. In addition, the step (d) of the method for forming an electrode board is the same as the step (c) of the method for forming a carbon nanotube composite.

Figure 12:
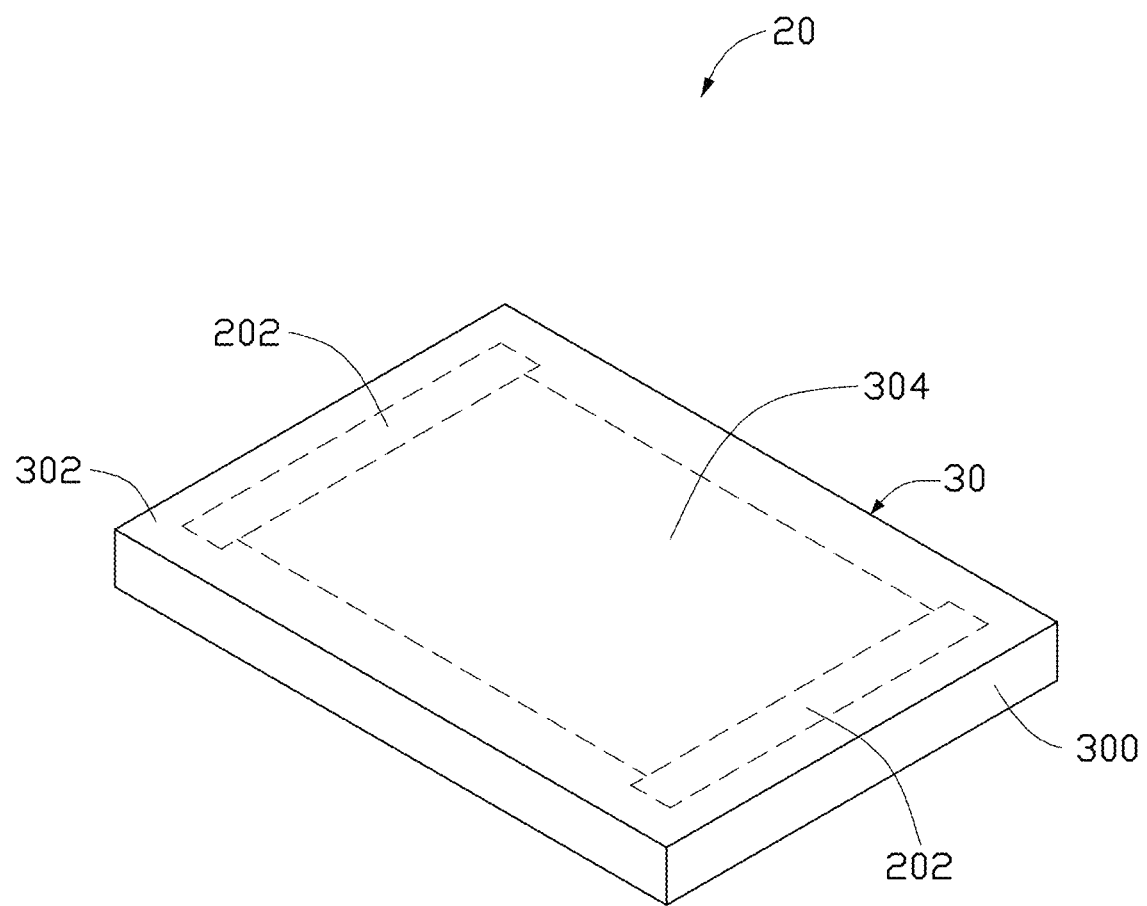
FIG. 12 is a schematic view of one embodiment of an electrode board.

Referring to FIG. 12, an electrode board 20 made by the above methods is also provided. The electrode board 20 includes a substrate 300, a carbon nanotube structure 304, and two electrodes 202. The substrate 300 and the carbon nanotube structure 304 form the carbon nanotube composite 30. The substrate 300 includes a top surface 302, the carbon nanotube structure 304 is disposed in the substrate 300 and below the surface 302. The carbon nanotube structure 304 is near the top surface 302 of the substrate 300. The electrodes 202 are disposed between opposite sides of the carbon nanotube composite 30 and are electrically connected to the carbon nanotube composite 30.

Figure 13:
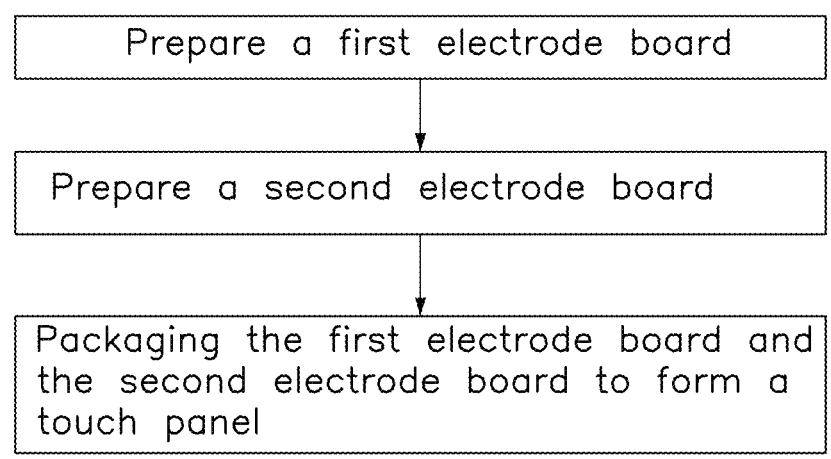
FIG. 13 is a flow chart of one embodiment of a method for forming a touch panel.

Referring to FIG. 13, a method for forming a touch panel includes:
(a) preparing a first electrode board;
(b) preparing a second electrode board; and
(c) packaging the first electrode board and the second electrode board to form a touch panel.

In the step (a), the first electrode board includes a first substrate, a first carbon nanotube structure, and two first electrodes. In the step (b), the second electrode board includes a second substrate, a second carbon nanotube structure, and two second electrodes.

In the step (c), a method of packaging the first electrode board and the second electrode board includes the steps of:
(c1) applying an insulating layer around sides of a surface of the second substrate of the second electrode board;
(c2) covering the first electrode board on the insulating layer such that the first carbon nanotube structure of the first electrode board and the second carbon nanotube structure of the second electrode board are disposed face to face; and
(c3) sealing the first electrode board, the second electrode board, and the insulating layer with sealant to form the touch panel.

The first carbon nanotube structure includes at least one carbon nanotube film. Similarly, the second carbon nanotube structure includes at least one carbon nanotube film. The carbon nanotube film can be a drawn carbon nanotube film, a pressed carbon nanotube film, or a flocculated carbon nanotube film.

Figure 14:
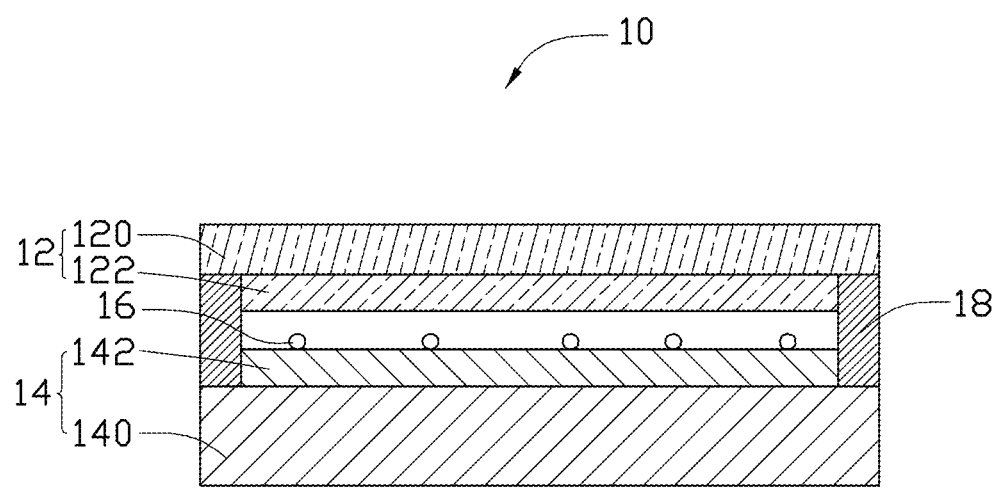
FIG. 14 is a schematic view of one embodiment of a touch panel.

Referring to FIG. 14, a touch panel 10 can be made by the above method. The touch panel 10 includes a first electrode board 12, a second electrode board 14, a number of transparent spacers 16, and an insulating layer 18. The transparent spacers 16 are disposed between the first electrode board 12 and the second electrode board 14. The insulating layer 18 is disposed around sides of a surface of the second electrode board 14 near the first electrode board 12.

Figure 15:
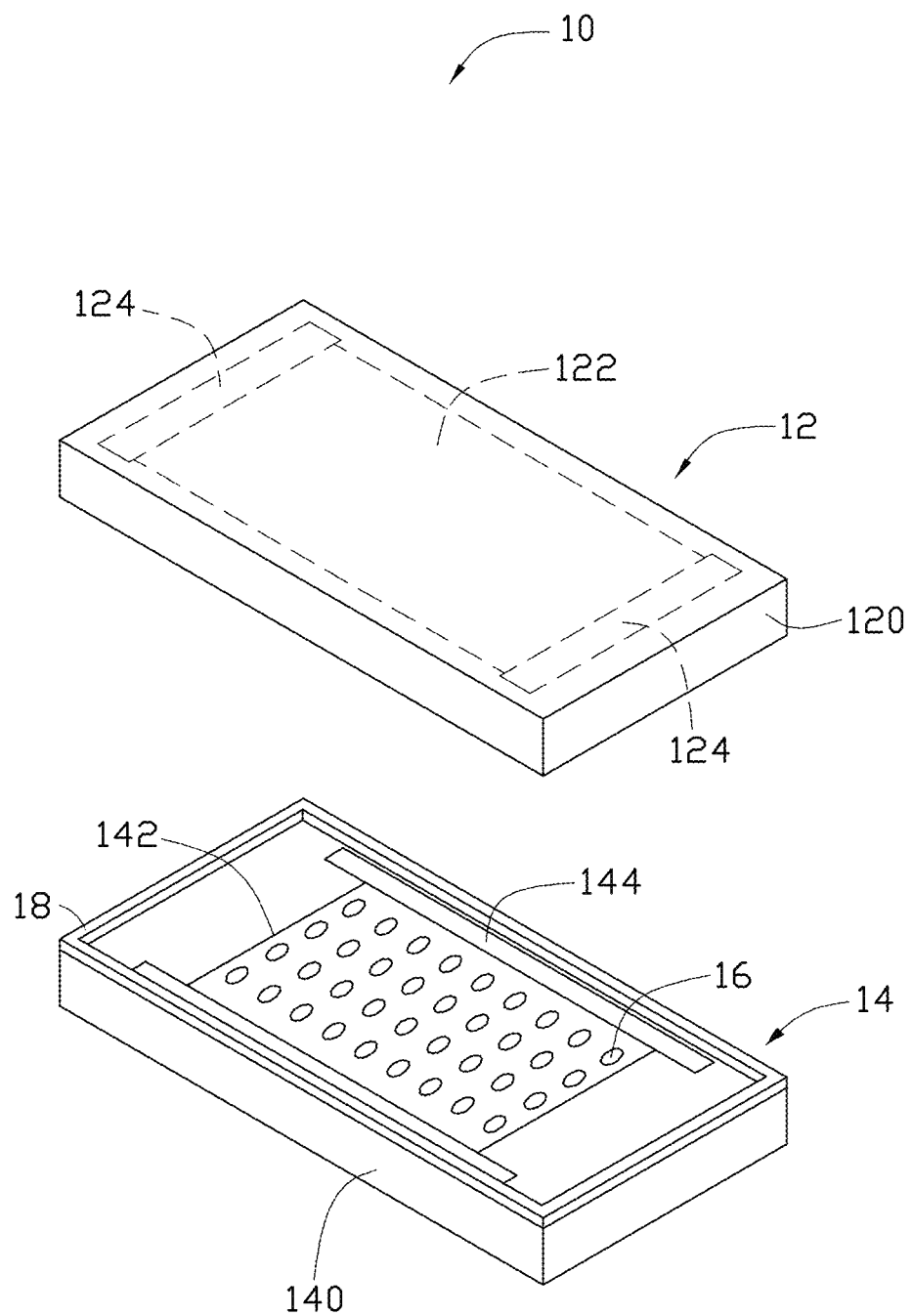
FIG. 15 is another schematic view of the touch panel shown in FIG. 14.

Furthermore, referring to FIG. 15, the first electrode board 12 includes a first substrate 120, a first carbon nanotube structure 122, and two first electrodes 124. The first substrate 120 is planar. The first carbon nanotube structure 122 and the first electrodes 124 are disposed on a bottom surface of the first substrate 120. The first electrodes 124 are respectively disposed on two sides of the first electrode board 12 along a first direction, and are electrically connected to the first electrode board 12. The second electrode board 14 includes a second substrate 140, a second carbon nanotube structure 142, and two second electrodes 144. The second substrate 140 is planar. The second carbon nanotube structure 142 and the second electrodes 144 are disposed on a top surface of the second substrate 140. The second electrodes 144 are respectively disposed on two sides of the second electrode board 14 along a second direction, and are electrically connected to the second electrode board 14. The first direction is substantially perpendicular to the second direction.

Finally, it is to be understood that the above-described embodiments are intended to illustrate rather than limit the present disclosure. Variations may be made to the embodiments without departing from the spirit of the disclosure as claimed. Elements associated with any of the above embodiments are envisioned to be associated with any other embodiments. The above-described embodiments illustrate the scope of the disclosure but do not restrict the scope of the disclosure.

It is also to be understood that above description and the claims drawn to a method may include some indication in reference to certain steps. However, the indication used is only to be viewed for identification purposes and not as a suggestion as to an order for the steps.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A touch panel, comprising:
   a first electrode board, wherein the first electrode board comprises a first substrate, a first carbon nanotube structure located on and buried under a first surface of the first substrate, and two first electrodes electrically connected to the first carbon nanotube structure; the first carbon nanotube structure is entirely buried under the first surface of the first substrate, and a first distance between the first carbon nanotube structure and the first surface of the first substrate is less than 10 micrometers; wherein the first carbon nanotube structure comprises a third surface and a fourth surface opposite to the third surface, the first substrate comprises a first polymer layer located on the third surface and a second polymer layer located on the fourth surface, the first polymer layer and the second polymer layer are made of a same material, and the first polymer layer and the second polymer layer are integrated;
   a second electrode board spaced from the first electrode board, wherein the second electrode board comprises a second substrate, a second carbon nanotube structure located on and buried under a second surface of the second substrate, and two second electrodes electrically connected to the second carbon nanotube structure; the second carbon nanotube structure is entirely buried under the second surface of the second substrate, and a second distance between the second carbon nanotube structure and the second surface of the second substrate is less than 10 micrometers; wherein the second carbon nanotube structure comprises a fifth surface and a sixth surface opposite to the fifth surface, the second substrate comprises a third polymer layer located on the fifth surface and a fourth polymer layer located on the sixth surface, the third polymer layer and the fourth polymer layer are made of a same material, and the third polymer layer and the fourth polymer layer are integrated;
   a plurality of transparent spacers disposed between the first electrode board and the second electrode board; and
   an insulating frame disposed between the first electrode board and the second electrode board and around the plurality of transparent spacers.

2. The touch panel of claim 1, wherein each of the first substrate and the second substrate comprises a material selected from the group consisting of polyethylene, epoxy, bismaleimide resin, cyanate resin, polypropylene, polyethylene, polyvinyl alcohol, polystyrene, polycarbonate, and polymethylmethacrylate.

3. The touch panel of claim 1, wherein the first carbon nanotube structure comprises a plurality of first carbon nanotubes combined by van der Waals force therebetween, and the second carbon nanotube structure comprises a plurality of second carbon nanotubes combined by van der Waals force therebetween.

4. The touch panel of claim 3, wherein the plurality of first carbon nanotubes are arranged along a first direction, and the plurality of second carbon nanotubes are arranged along a second direction.

5. The touch panel of claim 3, wherein the plurality of first carbon nanotubes are entangled with each other, and the plurality of second carbon nanotubes are entangled with each other.

6. The touch panel of claim 1, wherein the first carbon nanotube structure defines a plurality of first micro gaps so that the first polymer layer is integrated with the second polymer layer by permeating the plurality of first micro gaps, and the second carbon nanotube structure defines a plurality of second micro gaps so that the third polymer layer is integrated with the fourth polymer layer by permeating the plurality of second micro gaps.

7. The touch panel of claim 1, wherein a thickness of each of the first carbon nanotube structure and the second carbon nanotube structure is in a range from about 50 nanometers to about 10 micrometers.

8. The touch panel of claim 1, wherein a first resistance of the first surface of the first substrate is equal to or less than 8000 ohms, and a second resistance of the second surface of the second substrate is equal to or less than 8000 ohms.

9. The touch panel of claim 1, wherein each of the first distance and the second distance is in a range from about 10 nanometers to about 200 nanometers.

10. The touch panel of claim 1, wherein each of the first substrate and the second substrate is planar.

11. The touch panel of claim 1, wherein the two first electrodes are disposed on two sides of the first electrode board along a first direction, and the two second electrodes are disposed on two sides of the second electrode board along a second direction.

12. The touch panel of claim 1, wherein the first carbon nanotube structure comprises a plurality of first carbon nanotubes, the first carbon nanotube structure is entirely buried in the first substrate, so that an entire outer surface of each of the plurality of first carbon nanotubes is in direct contact with the first substrate.

13. A touch panel, comprising:
a first electrode board;
a second electrode board spaced from the first electrode board;
a plurality of transparent spacers disposed between the first electrode board and the second electrode board; and
an insulating frame disposed between the first electrode board and the second electrode board and around the plurality of transparent spacers;
wherein the first electrode board comprises a first substrate, a first carbon nanotube structure located on and buried under a first surface of the first substrate, and two first electrodes electrically connected to the first carbon nanotube structure; the first carbon nanotube structure is entirely buried under the first surface of the first substrate, and a first distance between the first carbon nanotube structure and the first surface of the first substrate is less than 10 micrometers;
wherein the first carbon nanotube structure comprises a third surface and a fourth surface opposite to the third surface, the first substrate comprises a first polymer layer located on the third surface and a second polymer layer located on the fourth surface, the first polymer layer and the second polymer layer are made of a same material, and the first polymer layer and the second polymer layer are integrated.

14. The touch panel of claim 13, wherein the first carbon nanotube structure comprises a plurality of first carbon nanotubes combined by van der Waals force therebetween.

15. The touch panel of claim 14, wherein the plurality of first carbon nanotubes are arranged along the same direction.

16. The touch panel of claim 14, wherein the plurality of first carbon nanotubes are entangled with each other.

17. The touch panel of claim 13, wherein the first carbon nanotube structure defines a plurality of first micro gaps so that the first polymer layer is integrated with the second polymer layer by permeating the plurality of first micro gaps.

18. The touch panel of claim 13, wherein a first resistance of the first surface of the first substrate is equal to or less than 8000 ohms.

19. The touch panel of claim 13, wherein the first distance is in a range from about 10 nanometers to about 200 nanometers.

20. The touch panel of claim 13, wherein the first electrode board is made by following steps:
disposing the first carbon nanotube structure on the first surface of the first substrate which is a single layer polymer substrate;
disposing the two first electrodes between opposite sides of the first carbon nanotube structure; and
disposing the first substrate, the first carbon nanotube structure, and the two first electrodes in an environment filled with electromagnetic waves, wherein the first carbon nanotube structure and the first substrate are heated by the electromagnetic waves so that the first carbon nanotube structure is buried under the first surface of the first substrate.

\* \* \* \* \*